(12) United States Patent
Rao et al.

(10) Patent No.: US 11,409,883 B1
(45) Date of Patent: Aug. 9, 2022

(54) BINDING CUSTOMER-SIGNED IMAGE TO A SPECIFIC PLATFORM

(71) Applicant: Dell Products L.P., Round Rock, TX (US)

(72) Inventors: Balaji Bapu Gururaja Rao, Austin, TX (US); Elie Jreij, Pflugerville, TX (US); Paul Vancil, Austin, TX (US); Marshal Savage, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 40 days.

(21) Appl. No.: 17/152,314

(22) Filed: Jan. 19, 2021

(51) Int. Cl.
  *G06F 21/57* (2013.01)
  *G06F 15/78* (2006.01)
  *G06F 13/42* (2006.01)

(52) U.S. Cl.
  CPC ........ *G06F 21/575* (2013.01); *G06F 13/4282* (2013.01); *G06F 15/7807* (2013.01)

(58) Field of Classification Search
  CPC . G06F 21/575; G06F 13/4282; G06F 15/7807
  See application file for complete search history.

(56) References Cited

U.S. PATENT DOCUMENTS

| | | | |
|---|---|---|---|
| 2009/0268915 A1* | 10/2009 | Kelly | H04L 9/0877 380/282 |
| 2014/0068238 A1* | 3/2014 | Jaber | H04L 63/045 713/189 |
| 2019/0065750 A1* | 2/2019 | Bolan | G06F 21/64 |
| 2019/0332775 A1* | 10/2019 | Savage | H04L 63/0823 |
| 2020/0134185 A1* | 4/2020 | Cho | G06F 21/602 |
| 2020/0143059 A1* | 5/2020 | Brown | G06F 21/445 |
| 2021/0021410 A1* | 1/2021 | Offenberg | H04L 9/0825 |
| 2021/0342491 A1* | 11/2021 | Vetteth | G06F 21/575 |

* cited by examiner

*Primary Examiner* — Glenn A. Auve
(74) *Attorney, Agent, or Firm* — Jackson Walker L.L.P.

(57) ABSTRACT

An information handling system may include a circuit board; a processor disposed on the circuit board, wherein the processor includes a media access control (MAC) address and a hidden root key (HRK) encoded therein; and a memory not disposed on the circuit board. The information handling system may be configured to: determine a customer public key (CPK); create a data structure comprising the CPK and the MAC address; encrypt the data structure using the HRK to generate an encrypted structure; and store the encrypted structure in the memory.

20 Claims, 3 Drawing Sheets

BINDING CUSTOMER-SIGNED IMAGE TO A SPECIFIC PLATFORM

TECHNICAL FIELD

The present disclosure relates in general to information handling systems, and more particularly to firmware images for management controllers of information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As discussed in more detail below, an information handling system may include a management controller such as a baseboard management controller (BMC). Typically the firmware image for such a management controller is provided and signed by the manufacturer/distributor/vendor of the information handling system. But in some instances, a customer may desire the ability to build and cryptographically sign their own BMC image (e.g., based on an open source project such as OpenBMC).

But the ability for a customer to do so may defeat the assurances provided by immutable root-of-trust implementations (also referred to as silicon-based root-of-trust), where only the vendor can sign and release BMC code.

It may be possible to enable customer signing and attempt to limit the signing to specific information handling systems by using a controlled method to store the customer's public key into a vendor-signed boot loader (e.g., uboot). Then the vendor-signed uboot may accept and chain load the customer-signed BMC images that are signed with the customer private key.

However, such a solution may not protect from the ability to move the customer-signed capability to another information handling system chassis, which might happen if the motherboard is maliciously moved to another chassis, or if the motherboard is returned for repair, put into service stock, and later sent out to replace a broken motherboard, or in other situations.

Embodiments of this disclosure may provide techniques to prevent a customer-signed firmware from being used in a different information handling system.

It should be noted that for purposes of this disclosure, the term "vendor" will be used to refer to any party such as the manufacturer, distributor, or vendor of an information handling system. Further, the term "BMC" may be used broadly to refer to any type of management controller. Further, the term "uboot" may be used broadly to refer to any type of boot loader.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with firmware images of management controllers of information handling systems may be reduced or eliminated.

In accordance with embodiments of the present disclosure, an information handling system may include a circuit board; a processor disposed on the circuit board, wherein the processor includes a media access control (MAC) address and a hidden root key (HRK) encoded therein; and a memory not disposed on the circuit board. The information handling system may be configured to: determine a customer public key (CPK); create a data structure comprising the CPK and the MAC address; encrypt the data structure using the HRK to generate an encrypted structure; and store the encrypted structure in the memory.

In accordance with these and other embodiments of the present disclosure, a method may be executed in an information handling system including a circuit board; a processor disposed on the circuit board, wherein the processor includes a media access control (MAC) address and a hidden root key (HRK) encoded therein; and a memory not disposed on the circuit board. The method may include: determining a customer public key (CPK); creating a data structure comprising the CPK and the MAC address; encrypting the data structure using the HRK to generate an encrypted structure; and storing the encrypted structure in the memory.

In accordance with these and other embodiments of the present disclosure, an article of manufacture may include a non-transitory, computer-readable medium having computer-executable instructions thereon that are executable by a processor of an information handling system that includes a circuit board; a processor disposed on the circuit board, wherein the processor includes a media access control (MAC) address and a hidden root key (HRK) encoded therein; and a memory not disposed on the circuit board, the instructions executable for: determining a customer public key (CPK); creating a data structure comprising the CPK and the MAC address; encrypting the data structure using the HRK to generate an encrypted structure; and storing the encrypted structure in the memory.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring

DETAILED DESCRIPTION

Figure 1:
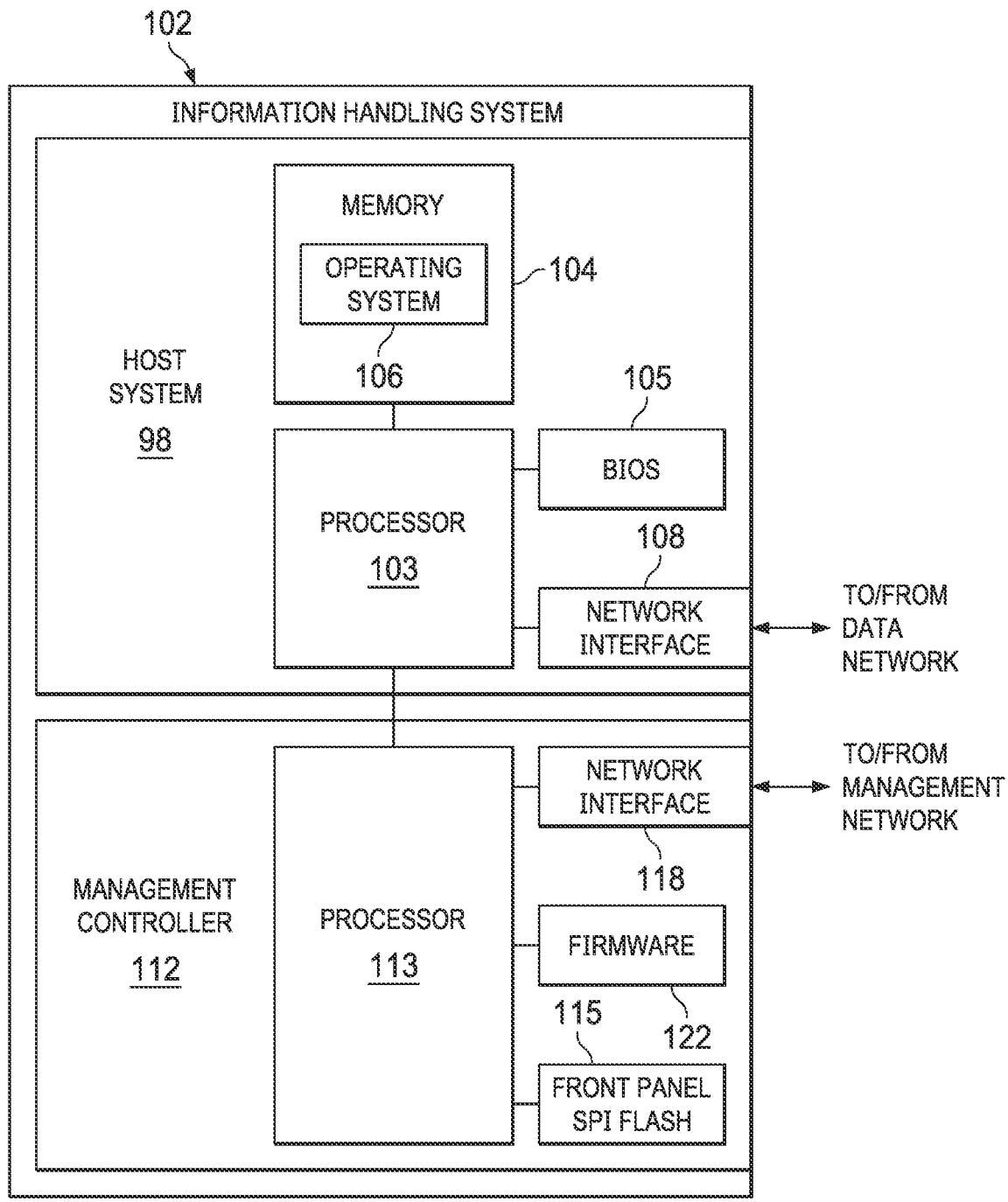
FIG. 1 illustrates a block diagram of an example information handling system, in accordance with embodiments of the present disclosure.
Figure 2:
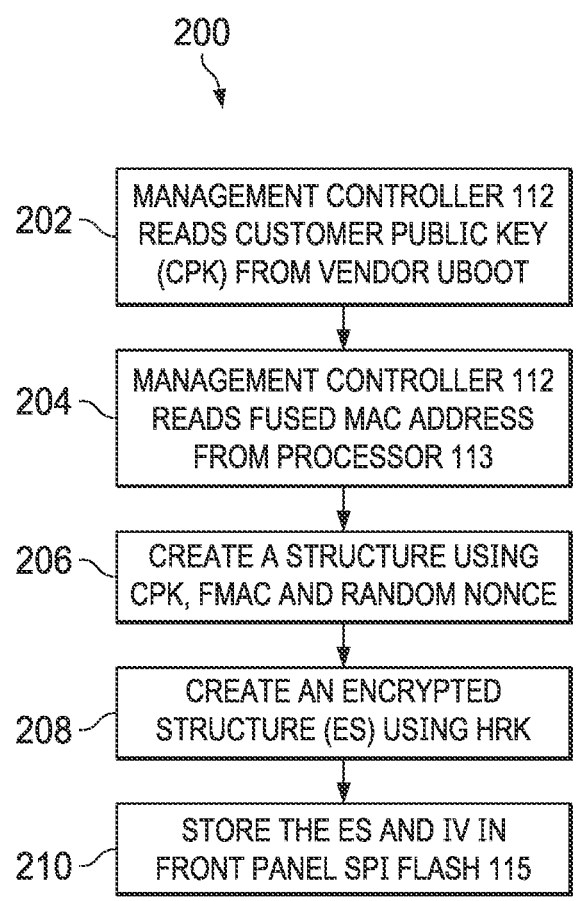
FIG. 2 illustrates a block diagram of an example method, in accordance with embodiments of the present disclosure.
Figure 3:
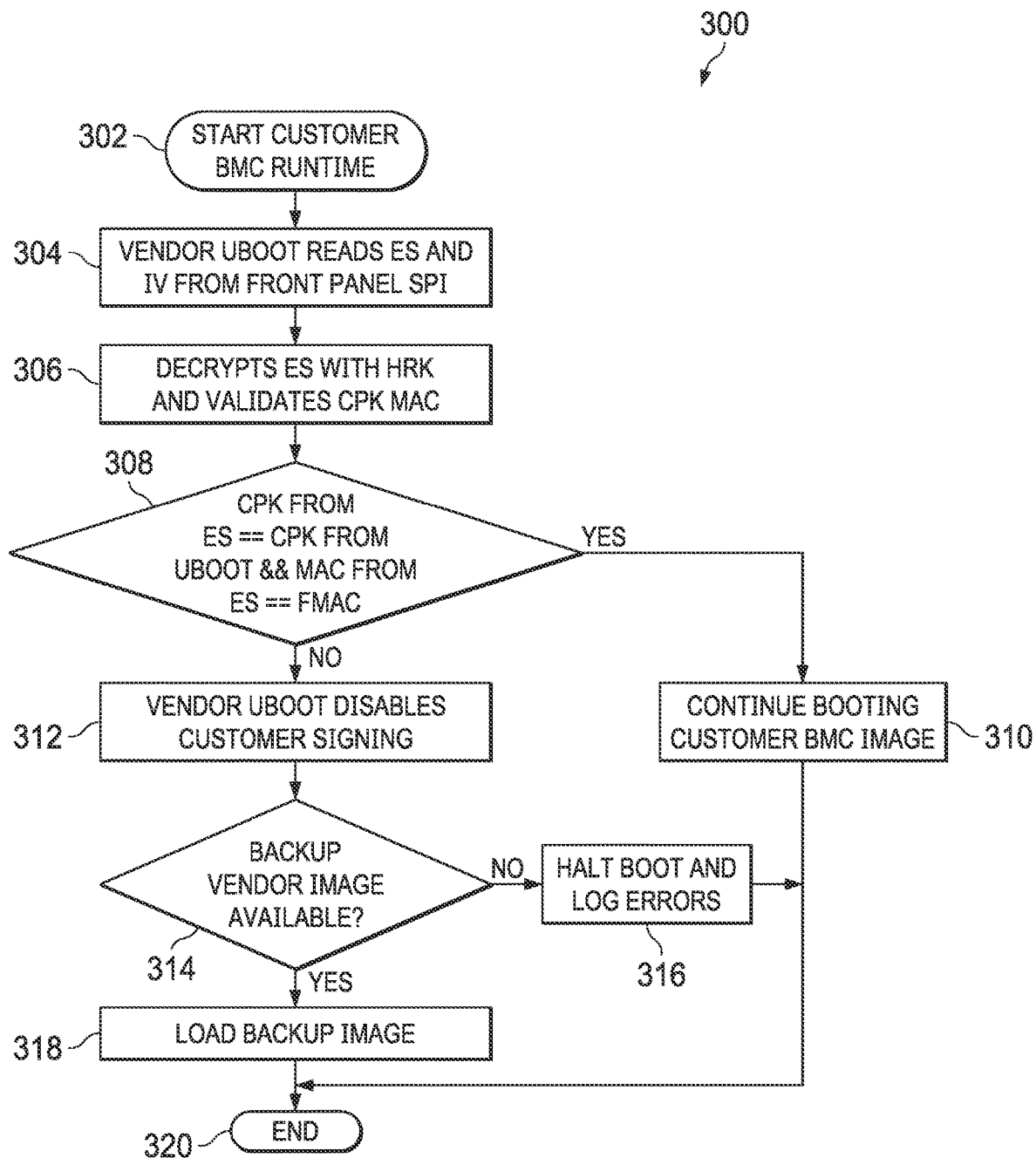
FIG. 3 illustrates a block diagram of an example method, in accordance with embodiments of the present disclosure.

Preferred embodiments and their advantages are best understood by reference to FIGS. 1 through 3, wherein like numbers are used to indicate like and corresponding parts. For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

Information handling system 102 may include a storage medium that is an integral part of the chassis thereof (e.g., disposed at a front panel of the chassis). In particular, any storage medium that is part of the chassis of information handling system 102 rather than part of a motherboard, backplane, etc. may be used for this purpose, because such storage medium is physically separate from management controller 112 (which would typically reside on the motherboard or backplane of information handling system 102). In some embodiments, such a storage medium may be implemented as front panel serial peripheral interconnect (SPI) flash 115.

Management controller 112 may include a firmware 122 therein. For example, firmware 122 may be embodied in a solid-state storage medium such as flash memory, EEPROM, etc.

As discussed above, the owner of information handling system 112 may desire to build and cryptographically sign their own image for firmware 122 (e.g., based on an open source project such as OpenBMC or the like).

Some embodiments of this disclosure may securely enable the use of customer-signed firmware images for firmware 122 by leveraging front panel SPI flash 115 to detect when a motherboard has been moved to another information handling system chassis. This may be done by leveraging a hidden root key (HRK) of management controller 112, which may be unique to each processor 113. For example, processor 113 may be a system on chip (SoC) that includes the HRK embedded therein, and the HRK may be inaccessible by firmware 122. For example, the HRK may be accessible only via a hardware encryption engine in processor 113.

Turning now to FIG. 2, a flow chart is shown of an example method 200 for enabling a customer-signed image for management controller 112, in accordance with some embodiments of this disclosure. In some embodiments, the various steps of method 200 may be carried out by management controller 112.

At step 202, during the enablement of a customer-signed image for management controller 112, management controller 112 may read the customer public key (CPK). In some embodiments, the customer may provide the CPK to the vendor, such that the CPK may be stored in the vendor uboot and thus accessible to management controller 112.

At step 204, management controller 112 may read its MAC address, which may be a fused MAC (FMAC) address that is not changeable and may be stored in processor 113. Management controller 112 may generate random nonce data (e.g., an initialization vector (IV)) as well.

At step 206, management controller 112 may create a data structure using the CPK, the FMAC, and the random nonce. The data structure may then be encrypted at step 208 using the HRK to generate an encrypted structure (ES). Any suitable type of encryption (e.g., symmetric or asymmetric) may be used in particular embodiments. The ES and the IV may then be stored in front panel SPI flash 115 at step 210, and the method may end.

One of ordinary skill in the art with the benefit of this disclosure will understand that the preferred initialization point for the method depicted in FIG. 2 and the order of the steps comprising that method may depend on the implementation chosen. In these and other embodiments, this method may be implemented as hardware, firmware, software, applications, functions, libraries, or other instructions. Further, although FIG. 2 discloses a particular number of steps to be taken with respect to the disclosed method, the method may be executed with greater or fewer steps than depicted. The method may be implemented using any of the various components disclosed herein (such as the components of FIG. 1), and/or any other system operable to implement the method.

Turning now to FIG. 3, a flow chart is shown of an example method 300 for booting management controller 112 after enablement of customer-signed firmware, in accordance with some embodiments of this disclosure.

At step 302, execution of the customer BMC runtime image begins. At step 304, the vendor uboot may read the encrypted structure and initialization vector from front panel SPI flash 115. At step 306, the vendor uboot may decrypt the encrypted structure with the HRK in order to obtain the CPK and the MAC address that were stored in the encrypted structure (which may be referred to as a "potential" CPK and a "potential" MAC address, to be compared with known values).

At step 308, the vendor uboot may validate the decrypted CPK from the encrypted structure against the CPK stored in the uboot; the vendor uboot may also validate the MAC address from the encrypted structure with the fused MAC address.

If these data match, it means that the motherboard has not been moved to another chassis, and the vendor uboot may proceed to chain load the customer firmware image at step 310.

If the data do not match, then the vendor uboot may disable booting to the customer-signed image at step 312.

At step 314, it may be determined whether or not a vendor-supplied backup image is available for firmware 122. If so, it may be loaded at step 318 and boot may continue.

If such a backup image is not found, the vendor uboot may halt the boot process and provide an error indication at step 316. For example, error indications may include displaying an error message on the video output, sending an error message over a serial connector, sending network alerts (e.g., an SNMP trap), etc. At step 320, method 300 may end.

One of ordinary skill in the art with the benefit of this disclosure will understand that the preferred initialization point for the method depicted in FIG. 3 and the order of the steps comprising that method may depend on the implementation chosen. In these and other embodiments, this method may be implemented as hardware, firmware, software, applications, functions, libraries, or other instructions. Further, although FIG. 3 discloses a particular number of steps to be taken with respect to the disclosed method, the method may be executed with greater or fewer steps than depicted. The method may be implemented using any of the various components disclosed herein (such as the components of FIG. 1), and/or any other system operable to implement the method.

Thus embodiments of this disclosure may provide many benefits. For example, customer image signing may effectively be automatically revoked when the motherboard is removed from the chassis. Further, supply chain protection may be ensured via the use of the HRK of management controller 112.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
a circuit board;
a processor disposed on the circuit board, wherein the processor includes a media access control (MAC) address and a hidden root key (HRK) encoded therein; and
a memory not disposed on the circuit board;
wherein the information handling system is configured to:
determine a customer public key (CPK);
create a data structure comprising the CPK and the MAC address;
encrypt the data structure using the HRK to generate an encrypted structure; and
store the encrypted structure in the memory.

2. The information handling system of claim 1, wherein the information handling system comprises a management controller.

3. The information handling system of claim 2, wherein the management controller is configured to carry out the determining, the creating, the encrypting, and the storing.

4. The information handling system of claim 1, wherein the memory is an integral part of a chassis of the information handling system.

5. The information handling system of claim 1, wherein the memory is a front-panel flash memory.

6. The information handling system of claim 5, wherein the front-panel flash memory is coupled to the processor via a serial peripheral interface (SPI) bus.

7. The information handling system of claim 1, wherein the data structure further comprises an initialization vector (IV), and wherein the information handling system is further configured to store the IV in the memory.

8. The information handling system of claim 1, wherein, during a subsequent boot process, the information handling system is further configured to:
read the encrypted structure from the memory;
decrypt the encrypted structure with the HRK to determine a potential MAC address and a potential CPK;
perform a first comparison between the potential MAC address and the MAC address;
perform a second comparison between the potential CPK and the CPK; and
in response to a mismatch in either the first comparison or the second comparison, disable execution of a customer-signed firmware image.

9. A method executed in an information handling system including a circuit board; a processor disposed on the circuit board, wherein the processor includes a media access control (MAC) address and a hidden root key (HRK) encoded therein; and a memory not disposed on the circuit board, the method comprising:
determining a customer public key (CPK);

creating a data structure comprising the CPK and the MAC address;
encrypting the data structure using the HRK to generate an encrypted structure; and
storing the encrypted structure in the memory.

10. The method of claim 9, wherein the CPK is encoded into a vendor boot loader of the information handling system.

11. The method of claim 9, wherein the processor is a system-on-chip (SoC) of a management controller.

12. The method of claim 9, wherein the method is performed in response to an instruction to enable execution of a customer-signed firmware image.

13. An article of manufacture comprising a non-transitory, computer-readable medium having computer-executable instructions thereon that are executable by a processor of an information handling system that includes a circuit board; a processor disposed on the circuit board, wherein the processor includes a media access control (MAC) address and a hidden root key (HRK) encoded therein; and a memory not disposed on the circuit board, the instructions executable for:
determining a customer public key (CPK);
creating a data structure comprising the CPK and the MAC address;
encrypting the data structure using the HRK to generate an encrypted structure; and
storing the encrypted structure in the memory.

14. The article of claim 13, wherein the information handling system comprises a management controller.

15. The article of claim 14, wherein the management controller is configured to carry out the determining, the creating, the encrypting, and the storing.

16. The article of claim 13, wherein the memory is an integral part of a chassis of the information handling system.

17. The article of claim 13, wherein the memory is a front-panel flash memory.

18. The article of claim 17, wherein the front-panel flash memory is coupled to the processor via a serial peripheral interface (SPI) bus.

19. The article of claim 13, wherein the data structure further comprises an initialization vector (IV), and wherein the information handling system is further configured to store the IV in the memory.

20. The article of claim 19, wherein the instructions are further executable for, during a subsequent boot process:
reading the encrypted structure from the memory;
decrypting the encrypted structure with the HRK to determine a potential MAC address and a potential CPK;
performing a first comparison between the potential MAC address and the MAC address;
performing a second comparison between the potential CPK and the CPK; and
in response to a mismatch in either the first comparison or the second comparison, disabling execution of a customer-signed firmware image.

* * * * *